Dec. 7, 1954     C. DE GANAHL     2,696,020
MANUFACTURE OF PIPE
Filed June 29, 1951
FIG. 1
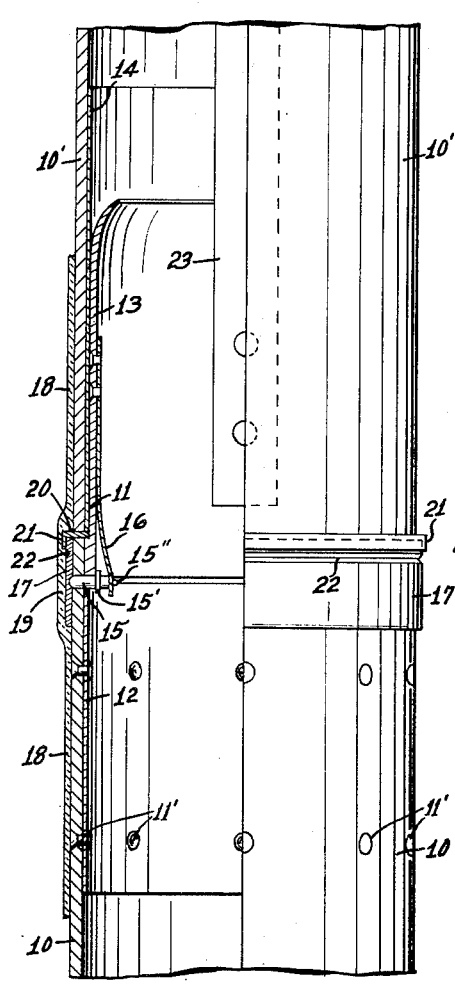
FIG. 2
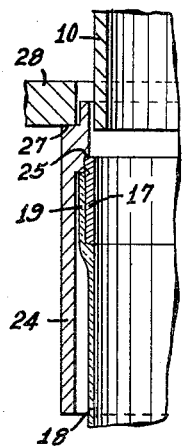
FIG. 3
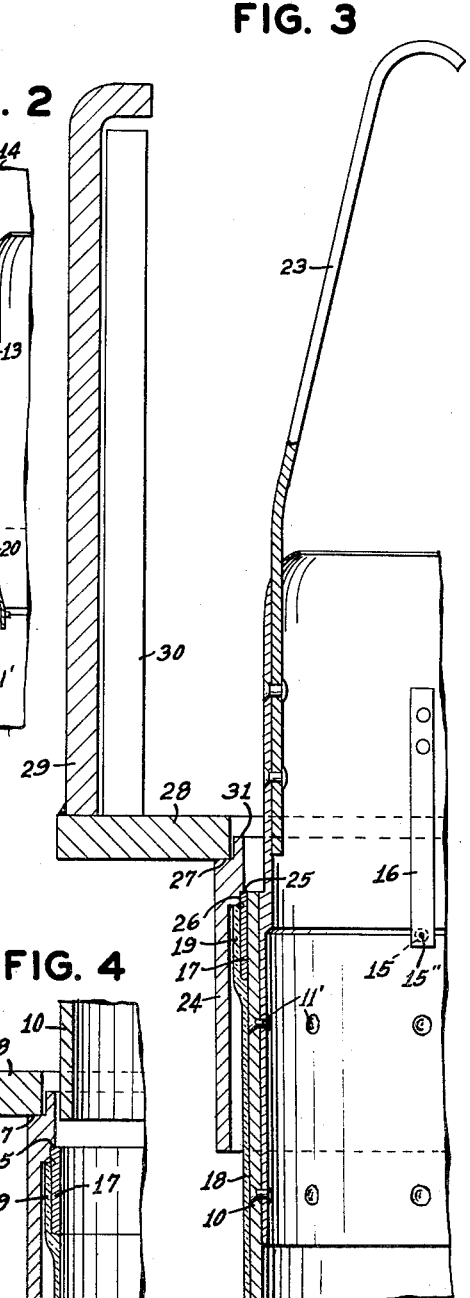
FIG. 5
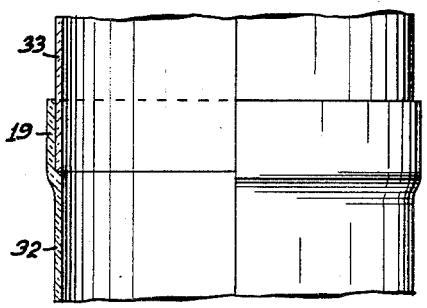
FIG. 4
INVENTOR
Carl de Ganahl
BY
ATTORNEYS

United States Patent Office 2,696,020
Patented Dec. 7, 1954

2,696,020

MANUFACTURE OF PIPE

Carl de Ganahl, Greenlawn, N. Y.

Application June 29, 1951, Serial No. 234,262

11 Claims. (Cl. 18—2)

This invention relates to the manufacture of plastic pipe of the type that is made by applying a coating of unpolymerized plastic material to a mandrel, setting the plastic on the mandrel, and then removing the resulting pipe from the mandrel. The invention provides an improved method for making such pipe, involving forming each length of pipe over a withdrawing ring, which greatly simplifies withdrawal of the pipe from the mandrel after the plastic has been set, and which also has the advantage of making it possible to form a female slip-joint member at the end of each length of pipe. The invention further provides an improved mandrel structure and accessory apparatus for use in carrying out the method of the invention.

A recently developed form of pipe comprises helically wound glass fiber rovings embedded in a cylindrical body of a substantially impervious thermoset plastic material. Such pipe is made by continuously wrapping glass fiber rovings, after they have been thoroughly impregnated with and coated by an unpolymerized liquid plastic composition, on a continuously advancing mandrel. The mandrel is made in sections, and the coating of glass fiber and plastic thereon is divided into suitable pipe lengths by cutting circumferentially at the joints between the mandrel sections. Each mandrel section with the coating thereon then is heated to set the plastic, and when this has been accomplished the resulting glass fiber and plastic pipe is removed from the mandrel. This last step of removing the pipe from the mandrel is a rather difficult operation to perform. The pipe is thin-walled and does not allow for ready gripping in a way that permits it to be stripped from the mandrel without damage either to the mandrel or to the pipe.

In accordance with the improved procedure of the present invention, each mandrel section on which a separate length of pipe is made is surrounded with a cylindrical ring, and the plastic coating is applied over the outer surface of such ring. Thereby, when the coating is polymerized or otherwise set, the ring is enclosed in the resulting length of pipe and provides for securing an effective grip on the pipe when the time comes to remove it from the mandrel. Preferably the ring surrounds the end portion of the mandrel section, so that it becomes enclosed in the end portion of the pipe. The plastic coating composition is applied over the outer cylindrical surface of the ring and against the end edge thereof that is adjacent the main body of the coating on the mandrel section; whereas the opposite end edge of the ring that is adjacent the end edge of the mandrel section is freed from plastic material. It is the resulting exposed end portion of the ring that is gripped, after the coating has been polymerized, to hold the pipe while the mandrel is being withdrawn. The ring is advantageously of substantially the same wall thickness and of substantially the same outside diameter as the main body of the completed pipe; and after the length of pipe has been removed from the mandrel section, the ring is removed from within the end portion thereof, whereby one end of the finished pipe is formed with a female slip-joint element.

The new pipe-making apparatus of the invention comprises a mandrel structure made up of a plurality of cylindrical mandrel sections adapted to be detachably joined together in substantially abutting end-to-end relation. A short cylindrical withdrawing ring surrounds each mandrel section at one end thereof adjacent the joint with a neighboring mandrel section. A bullet catch or equivalent resilient means is advantageously provided for detachably holding the withdrawing ring in position on the end of the mandrel section.

Generally the mandrel structure is passed vertically through the apparatus wherein the glass fiber and plastic coating is applied to its outer surface, and to prevent unset liquid plastic composition from flowing into the annular juncture between the inner surface of the withdrawing ring and the outer surface of the mandrel section, an annular cap covering such juncture is mounted between each adjoining pair of mandrel sections.

Each mandrel section is provided with a bail secured to it interiorly of its cylindrical outer surface and preferably adjacent the end on which the ring is mounted. This bail provides a convenient grip for lifting the mandrel section, and for exerting a pulling force on it when the time comes to pull the mandrel out from within the length of plastic pipe formed thereon. To exert a corresponding opposing stripping force on the pipe itself, a stripper for engagement with the withdrawing ring is provided. This stripper advantageously is in the form of a cylindrical member adapted to be placed over the ring and formed interiorly with an annular shoulder arranged to engage the end surface of the ring. Finally, a fixed bracket plate or equivalent means is provided for engaging the stripper and therethrough for exerting a restraining force on the ring when a pulling force is applied to the bail to pull the mandrel section through the ring and thus out from within the plastic pipe which has been formed upon the surface of the mandrel.

A presently preferred embodiment of the invention is described below with reference to the accompanying drawings, in which Fig. 1 is an elevation, partially in longitudinal section, of the new mandrel structure of the invention, showing two mandrel sections joined together;

Fig. 2 is a fragmentary view of the joint between two mandrel sections as they are being separated after a plastic coating thereon has been circumferentially severed;

Fig. 3 is a fragmentary view of the upper end portion of a mandrel section showing its withdrawing ring in engagement with a stripper and stripper bracket plate preparatory to removing a length of plastic pipe from the mandrel;

Fig. 4 is a fragmentary view similar to Fig. 3 showing the final withdrawal of the mandrel from the pipe; and Fig. 5 is an elevation, partially in longitudinal section, through a joint between two lengths of pipe produced in accordance with the invention.

In the copending application Serial No. 180,066 of myself and John A. Grant and Clare E. Bacon, a procedure as follows is described for making pipe of plastic material reinforced with rovings of glass fibers: A cylindrical mandrel is passed vertically up through apparatus by which one or more layers of glass fiber rovings, thoroughly impregnated and coated with an unpolymerized liquid thermosetting plastic composition, are wrapped helically thereon. The mandrel is advanced continuously up through such apparatus, mandrel sections being joined as required to the lower end of the mandrel section passing through the apparatus and mandrel sections with the glass fiber and plastic coating thereon being removed again above the device after the coating has been cut circumferentially in the vicinity of the joint between mandrel sections. The individual mandrel sections with the coating of glass fiber and plastic thereon is heated to set the plastic. Then the coating, which now constitutes a length of glass-reinforced thermoset plastic pipe, is removed by withdrawing the mandrel section from inside it.

The apparatus and method of the present invention is especially adapted to facilitate the manufacture of pipe by the method described in the aforesaid application. Referring first to Fig. 1 of the drawings, the mandrel structure of the present invention comprises a plurality of individual mandrel sections 10, 10' joined together in end-to-end relation. These mandrel sections are advantageously convenient lengths of tubing, smooth-finished on their outer surfaces, of outside diameter corresponding to the inside diameter of the pipe to be formed on them. Each adjoining pair of mandrel sections is held together in alignment by a mandrel tip 11. This mandrel tip is in the form of a sleeve the lower portion 12 of which is of outside diameter such as to fit snugly within the upper end portion of a mandrel section, and the upper portion 13 of which is of slightly smaller outside diameter so as to fit snugly within a bottom insert sleeve 14 positioned within the lower end portion of the adjoining mandrel section. The sleeve 14 is provided to reinforce the lower end portion of the mandrel section and to take the wear incident to repeated attachment to and removal from the mandrel tips of other mandrel sections.

The mandrel tip 11 is securely attached, as by rivets 11', to the upper end of the mandrel section 10.

A plurality of round-end retaining pins 15, spring pressed through aligned openings in the mandrel tip and in the wall of the mandrel section by leaf springs 16, are provided to hold a withdrawing ring 17 in place at the upper end of the mandrel section 10. The withdrawing ring 17 is a short cylindrical ring surrounding the upper end portion of the lower mandrel section 10 adjacent the joint between the two mandrel sections. This ring is of inside diameter such as to fit rather closely about the outer surface of the mandrel section, but not too closely to prevent it from sliding readily along the mandrel. It is normally held in place at the upper end of the mandrel section 10, with its upper edge lying substantially in the same plane as the upper edge of the mandrel section on which it is mounted, by projection of the rounded ends of the pins 15 into shallow spherically curved depressions formed on the inner surface of the ring. The pins 15 and springs 16 serve in the fashion of a bullet catch to hold the ring resiliently in place. Only one such retaining pin 15 is shown in the drawings, but it is understood that a plurality of such pins at spaced intervals about the circumference of the mandrel advantageously are provided. Annular collars (or shoulders) 15' may be formed on the pins 15 to limit the extent to which such pins may enter the holes receiving them. Also, the pins 15 may be provided at the end engaged by the leaf spring 16 with small projections 15" which pass through corresponding holes in the leaf springs to prevent such springs from slipping accidentally off the pins.

A coating 18 of glass fiber reinforced plastic (shown only in section on the left-hand side of Fig. 1) is applied to the outer surface of the mandrel as the mandrel is advanced upwardly through a suitable applying device. The application of the glass fiber and plastic composition is substantially continuous, and at the joint between the mandrel sections 10' and 10 it is applied over the withdrawing ring 17, as indicated at 19.

In order to prevent the liquid unpolymerized plastic component of the coating from flowing into the annular juncture between the inner cylindrical surface of the withdrawing ring 17 and the outer cylindrical surface of the mandrel section 10, an annular cap 20 is positioned over the upper edge of the withdrawing ring 17 and the adjacent upper edge of the lower mandrel section 10, at the joint between the two mandrel sections. The plane annular surface of the cap overlies the juncture between the ring 17 and the mandrel section 10; and the cap advantageously is provided with a depending annular flange 21 which surrounds the outer surface of the ring 17 adjacent its upper edge, thereby to insure against the flow of liquid plastic material horizontally between the cap and the withdrawing ring and to keep the upper portion of the withdrawing ring free from plastic.

When each mandrel section has been covered throughout its length with the coating 18 of glass fibers and plastic composition and has been advanced completely through the coating-applying apparatus, the coating is severed circumferentially adjacent the joint between mandrel sections. For this purpose, the withdrawing ring 17 is advantageously provided on its outer surface with a circumferential groove 22. By running a knife edge or other cutting device around the outer surface of the coating where it overlies this groove, the glass fibers and the plastic of the coating are both readily cut through. Then the upper mandrel section 10' with the coating thereon is lifted away from the lower mandrel section 10, as illustrated in Fig. 2. To facilitate lifting the mandrel section, a bail 23 (Figs. 1 and 3) is riveted or otherwise secured to the upper portion 13 of the mandrel tip 11, the tip itself, of course, being secured to the mandrel section by rivets 11'. After the upper mandrel section 10' has been lifted away from the adjoining lower mandrel section 10, the cap 20 is removed by lifting it over the top of the mandrel tip 11 to expose the upper end edge of the withdrawing ring 17.

The mandrel section with its coating of glass fiber and unpolymerized plastic composition is next subjected to whatever heating or other treatment is necessary to set the plastic. The manner in which the plastic is set depends on what particular plastic composition is used, and forms no part of the present invention. At this point, however, the plastic is polymerized or otherwise is converted to solid form, and thereby the coating on the mandrel is converted to a length of more or less rigid pipe which need only be removed from the mandrel in order to be made ready for use.

To remove the pipe from the mandrel, a cylindrical stripper member 24 (Fig. 3) is placed over the upper end portion of the withdrawing ring 17, where the latter had been kept free of plastic by the cap flange 21. The stripper member is formed interiorly with an annular shoulder 25 which abuts against the exposed upper edge of the withdrawing ring. The inside diameter of the stripper member above this shoulder is slightly greater than the outside diameter of the mandrel section, so that the mandrel can be pulled up through it, but it is enough smaller than the outside diameter of the ring 17 so that the ring seats securely on the shoulder 25. Below the shoulder 25, the stripper member 24 is formed interiorly with a cylindrical surface 26 of such diameter as to fit accurately about the outer surface of the plastic-free upper portion of the ring 17. Thereby the stripper member is centered accurately on the ring. Below the cylindrical surface 26, the stripper member is of sufficient inside diameter as to fit readily over the upper end of the pipe on the mandrel 10.

The stripper member is formed exteriorly with an annular shoulder 27 designed to abut against a plate 28 attached by brackets 29 to some rigid framework 30. The plate 28 may if desired be formed with a circular hole of such size as to receive the extreme end portion 31 of the stripper 24 and so to center the stripper in the hole, but small enough so that the exterior annular shoulder 27 of the stripper member abuts against the plate 28 about the periphery of such hole. Alternatively the plate 28 may be formed with a U-shaped aperture, the width of which is such as to receive the upper end portion 31 of the stripper member but small enough for the exterior shoulder 27 of the stripper to abut against the plate along the sides of such U-shaped aperture.

To remove the length of pipe 18 from the mandrel 10, the stripper member 24 is mounted in place on the withdrawing ring 17 and then the assembly is lifted to bring the stripper member into engagement with the plate 28, as shown in Fig. 3. Thereupon a lifting force is exerted on the bail 23. Since the withdrawing ring 17 cannot be pulled through the upper end portion of the stripper member, which is held down by the restraining force exerted by the plate 28, the mandrel 10 is lifted out of the pipe, which is itself held down by the withdrawing ring, and up through such ring and but through the stripper 24. The resilient attachment of the withdrawing ring 17 to the upper end portion of the mandrel section 10 that is provided by the bullet catch engagement of the pins 15 with the inner surface of the ring permits the mandrel 10 to be drawn up through the ring 17 quite easily when the ring is held in place by the stripper member and a sufficient upward pulling force is exerted on the bail 23.

It is of course apparent that the withdrawing ring 17 is in secure engagement with the end portion of the pipe 18, being located interiorly of the enlargement 19 formed at the end of the pipe where the glass fiber and plastic materials were applied over the ring. In consequence, the pipe 18 is readily and reliably stripped from the mandrel section 10, without damage either to the mandrel or to the length of pipe.

When the mandrel section 10 has been completely withdrawn from the pipe 18, as illustrated in Fig. 4, then only the withdrawing ring 17 itself need be removed. The invention provides no particular means for removing the withdrawing ring from within the enlargement 19 at the end of the pipe, as this is a comparatively simple operation. It can be removed by hand, using hand tools, or if desired it can be removed by mechanical means which grip the pipe on the one hand and the ring on the other hand and exert a pulling force or twisting force between these two members. In some cases, it may be desirable simply to cut off the enlarged end of the pipe in which the withdrawing ring remains, and to discard the ring with the cut off end of the pipe. It is, however, a particular advantage of the invention that by making the withdrawing ring of the same thickness as the wall of the pipe (i. e. by making the ring with an outside diameter substantially equal to that of the pipe), the enlargement 19 which is formed by the withdrawing ring at the end of the pipe becomes the female element of a slip-joint pipe connection, adapted to receive the plain end of another length of pipe for the purpose of joining the two lengths together. A pipe joint made in this fashion from two lengths of pipe 32 and 33 is illustrated partially in section and partially in elevation in Fig. 5. The joint may if desired be made permanent by applying an adhesive to the inner surface of the female element 19 or to the outer surface of the end of the pipe 33 received therein, and allowing the adhesive to set in the joint.

From a consideration of Fig. 2, it will be apparent that one end of each length of pipe (the end which was formed at the lower extremity of each mandrel section) is enlarged somewhat or otherwise deformed because the plastic composition was severed circumferentially below the flange 21 of the cap 20. It is of course apparent that this deformity at the end of the pipe will normally be cut off and discarded.

I claim:

1. In a process for the manufacture of pipe of polymerized plastic material, in which a coating of unpolymerized plastic material is applied to a mandrel section and after being polymerized is removed from said section in the form of a length of pipe, the improvement which comprises surrounding said mandrel section with a cylindrical ring of material harder than said polymerized plastic and applying the coating over the outer surface of said ring, whereby when said coating is polymerized the ring is enclosed in the resulting length of pipe and provides for securing an effective grip thereon in the course of removing the pipe from the mandrel section.

2. In a process for the manufacture of pipe of polymerized plastic material, in which a coating of unpolymerized plastic material is applied to a mandrel section and after being polymerized is removed from said section in the form of a length of pipe, the improvement which comprises surrounding said mandrel section at one end thereof with a cylindrical ring of material harder than said plastic material, applying the plastic coating over the outer cylindrical surface of said ring and against the end edge thereof that is most remote from the end of the mandrel section, freeing the end edge of the ring that is adjacent the end of the mandrel section from plastic material, and, after said coating has been polymerized, gripping the exposed end edge of the ring to hold the pipe while withdrawing the mandrel therefrom.

3. In a process for the manufacture of pipe of polymerized plastic material, in which a coating of unpolymerized plastic material is applied to a mandrel section and after being polymerized is removed from said section in the form of a length of pipe, the improvement which comprises surrounding said mandrel section at one end thereof with a closely fitting cylindrical ring of essentially the same wall thickness as said plastic coating and of material harder than said polymerized plastic, applying the coating over the outer cylindrical surface of said ring and against the end edge thereof that is adjacent the main body of coating on the mandrel section, freeing the opposite end edge of the ring that is adjacent the end of the mandrel section from plastic material, gripping said exposed end edge of the ring after the coating has been polymerized to hold the pipe while withdrawing the mandrel therefrom, and thereafter removing the ring from within the end portion of the pipe, whereby the length of pipe is formed at one end with a female slip-joint element.

4. In a method of making pipe comprising a cylindrical body of plastic material, in which a continuous coating of plastic material is applied to the outer surface of a mandrel comprising at least two mandrel sections joined together in substantially abutting end-to-end relation, the improvement which comprises surrounding said mandrel adjacent the joint between the two sections with a cylindrical ring of material harder than said plastic material, applying said coating over the outer surface of said ring where the ring surrounds the mandrel, subsequently severing said coating where it is applied over the ring, separating the mandrel sections with the now separate lengths of coating thereon, whereby one end edge of the ring is exposed, and ultimately removing the coating to form a length of pipe by gripping the mandrel section interiorly of the coating, separately gripping the exposed end edge of the ring, and pulling the mandrel section through the ring, said ring by its position inside the coating serving to force the coating from the mandrel in the course of such pulling operation.

5. Pipe-making apparatus of the character described comprising a cylindrical mandrel section, a short metallic cylindrical withdrawing ring surrounding said mandrel section adjacent one end thereof, a bail secured interiorly to said mandrel section for exerting a pulling force thereon, a stripper comprising a cylindrical member formed interiorly with an annular shoulder adapted to be placed over said withdrawing ring with said shoulder engaging the end surface of the ring, and means adapted to engage said stripper and through it to restrain movement of said withdrawing ring when a pulling force is applied to said bail to pull the mandrel section through the ring.

6. In pipe-making apparatus of the character described in which a pipe of plastic material is formed on the outer surface of a mandrel, a mandrel structure comprising a cylindrical mandrel section, a short metallic cylindrical withdrawing ring surrounding said mandrel section adjacent the end thereof, and bullet catch means normally holding said ring in position on said mandrel section but permitting the mandrel section to be pulled through the ring when the ring is held against movement and a pulling force is exerted on the mandrel section.

7. In pipe-making apparatus of the character described in which a pipe of plastic material is formed on the outer surface of a mandrel, a mandrel structure comprising a cylindrical mandrel section, and a short metallic cylindrical withdrawing ring fitting closely about one end portion of said mandrel section but slidable therealong, a circumferential groove being formed in the outer surface of said ring to facilitate severing circumferentially a continuous coating of plastic material applied thereover.

8. In pipe-making apparatus of the character described in which a pipe of plastic material is formed on the outer surface of a mandrel, a mandrel structure comprising a cylindrical mandrel section, a short metallic cylindrical withdrawing ring surrounding said mandrel section adjacent the end thereof, the inside diameter of said ring being only enough larger than the outside diameter of the mandrel section to permit the mandrel section to be drawn easily therethrough, and the outside diameter of said ring being only enough larger than the normal outside diameter of the pipe formed on the mandrel so as to form a female slip-joint element at the end of the pipe where the plastic material is applied over the ring, and means normally holding said withdrawing ring in position at the end of the mandrel section but permitting the mandrel section to be pulled through the ring when the ring is held stationary and a pulling force is exerted on the mandrel section.

9. In pipe-making apparatus of the character described in which a pipe of plastic material is formed on the outer surface of a vertical mandrel, a mandrel structure comprising upper and lower vertical cylindrical mandrel sections detachably joined together in substantially abutting end-to-end relation, a cylindrical metallic withdrawing ring surrounding the upper end portion of the lower mandrel section, the upper edge of said ring being substantially in the same plane as the upper edge of said lower mandrel section, and an annular cap positioned between the two mandrel sections and covering the annular juncture between the interior surface of the withdrawing ring and the outer surface of the lower mandrel section, whereby plastic material applied in the liquid state to the upper mandrel section is prevented from flowing down between said ring and the outer surface of the lower mandrel section.

10. In pipe-making apparatus of the character described in which a pipe of plastic material is formed on the outer surface of a vertical mandrel, a mandrel structure comprising upper and lower vertical cylindrical mandrel sections detachably joined together in substantially abutting end-to-end relation, a cylindrical metallic withdrawing ring surrounding the upper end portion of the lower mandrel section, the upper edge of said ring being substantially in the same plane as the upper edge of said lower mandrel section, and an annular cap positioned between the two mandrel sections, said cap comprising a plane annular surface covering the annular juncture between the interior surface of the ring and the outer surface of the lower mandrel section and having a depending cylindrical flange surrounding the outer surface of the ring adjacent the upper edge thereof, whereby plastic material applied in the liquid state to the upper mandrel section is prevented from flowing down between said ring and the outer surface of the lower mandrel section.

11. In pipe-making apparatus of the character described in which a pipe of plastic material is formed on the outer surface of a vertical mandrel, a mandrel structure comprising upper and lower vertical cylindrical mandrel sections detachably joined togetheer in substantially abutting end-to-end relation, a cylindrical metallic withdrawing ring surrounding the upper end portion of the lower mandrel section, the upper edge of said ring being substantially in the same plane as the upper edge of said lower mandrel section, bullet catch means resiliently holding said ring in said position on the lower mandrel section but permitting the mandrel section to be pulled through the ring when the ring is held against movement and a pulling force is exerted on a mandrel section, and an annular cap positioned between the two joined mandrel sections and covering the annular juncture between the interior surface of the ring and the outer surface of the lower mandrel section, whereby plastic material applied in the liquid state to the upper mandrel section is prevented from flowing down into said annular juncture.

References Cited in the file of this patent

UNITED STATES PATENTS

| Number | Name | Date |
|---|---|---|
| 999,004 | Andrews | July 25, 1911 |
| 1,130,030 | Sill | Mar. 2, 1915 |
| 1,251,175 | Boyer | Dec. 25, 1917 |
| 1,284,297 | Frederick | Nov. 12, 1918 |
| 1,736,699 | Davis | Nov. 19, 1929 |
| 1,801,613 | Ratzer | Apr. 21, 1931 |
| 2,509,531 | Ruhland | May 30, 1950 |
| 2,528,155 | Magnani | Oct. 31, 1950 |